Aug. 31, 1926.
O. R. WIKANDER
1,598,228
SPRING DEVICE
Filed August 4, 1924
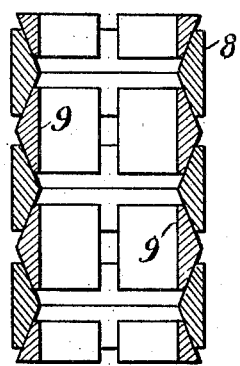
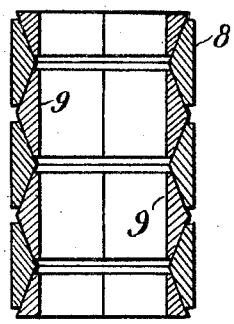
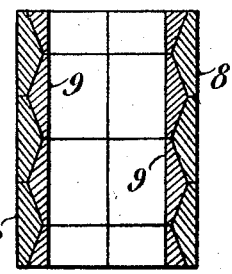
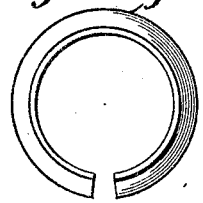
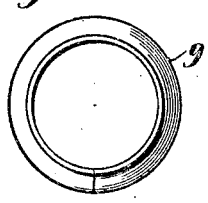
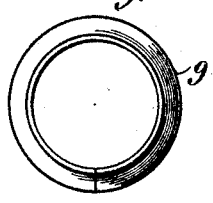
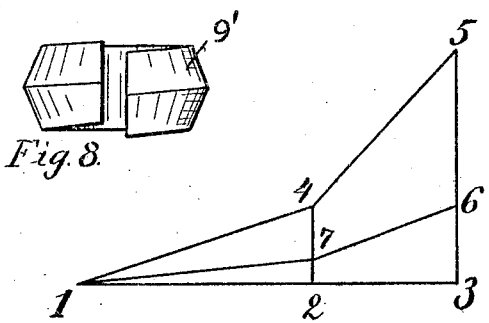
INVENTOR
Oscar R. Wikander Patented Aug. 31, 1926.

1,598,228

UNITED STATES PATENT OFFICE.

OSCAR R. WIKANDER, OF RYE, NEW YORK.

SPRING DEVICE.

Application filed August 4, 1924. Serial No. 730,033.

My invention relates to improvements in spring devices built up of a plurality of outer and inner rings which bear against one another along complemental tapered surfaces. A spring device of this character has become known which consists of a series of "inexpansible", integrally closed outer rings cooperating and alternating with "compressible", open inner rings, which bear against the outer rings along complemental tapered faces. In this arrangement the spring action is not carried up to or beyond the point where the ends of the inner rings abut, but is entirely dependent upon the bending and possibly some distorting action, produced in said inner rings during their expansion and contraction. The tensile stresses produced in the outer rings are so small that said rings are not materially expanded, even if the inner rings are worked to the elastic limits of their material for compression on the inside and for tension on the outside of the inner rings. The description of this known arrangement refers, therefore, to the outer rings as "inexpansible". A spring of this type can be designed for a relatively long travel, but has the disadvantage that the amount of work stored in it during compression is only about one-sixth of the amount of work stored in a helical spring of the same weight and the same maximum stresses.

The present invention deals with an improvement on this known spring construction, which will greatly increase the work-absorbing capacity thereof without increasing the weight or the occurring maximum stresses. This improvement consists simply in so constructing the springs that the end faces of the normally open inner rings will abut before the compression stroke is completed or the spring goes solid.

During the part of the stroke which takes place after the ends of the open inner rings meet, these latter rings will be subjected to additional compression stresses and will react on the integrally closed outer rings with such force that the latter can be expanded up to the elastic limit of the material.

During this latter part of the stroke the action of the spring will be identical to that of another known spring arrangement, which consists of a series of integrally closed outer rings coacting along complemental tapered friction faces with integrally closed inner rings, an arrangement which shows a very large work-absorbing capacity.

The spring, which is the subject of this invention, thus combines the advantages of the known open ring spring, which permits of a relatively long travel with a limited number of rings, with those of the known closed ring spring, which has a very large work-absorbing capacity per unit of weight or volume.

My invention will readily be understood when described in connection with the accompanying drawing, in which Figs. 1, 3 and 5 show longitudinal sections through the new spring in three succeeding stages of compression; Figs. 2, 4 and 6 are plan views of the inner rings in corresponding stages of compression; Fig. 7 is a diagram in which the horizontal line 1, 2, 3 represents the travel of the spring, whilst the distances 2—4 and 3—5 of the broken line 1, 4, 5 from 1, 2, 3 represent the resistances at each point of said travel which the spring opposes to the compression at that point. The line 6, 7, 1 represents in like manner the forces exterted by the spring during its recoil movement. Fig. 8, lastly, is a side elevation of a slightly helically distorted inner ring.

The spring unit comprises a series of integrally closed outer rings 8 and split, normally open inner rings 9 in nested relation, slidingly bearing against each other with their complemental tapered friction faces. Instead of the straight inner rings 9 shown in Fig. 1, I may also use more or less helically distorted rings 9', shown in Fig. 8.

Upon axial pressure being brought to bear on the free spring (Fig. 1) the outer rings 8 will be only very slightly expanded and the inner rings 9 (or 9') will be gradually closed during the first stage of compression, which is represented by the line 1—4 of the diagram, until they are fully closed (Figs. 3 and 4), the distance 2—4 representing the compression resistance. From this point on, the resistance increases rapidly along line 4—5 until the fully compressed state (Fig. 5) has been reached.

In the above description the term "integrally closed" as applied to the outer rings distinguishes these rings from the split inner rings, which are normally, that is when not under stress, open, but become temporarily closed when driven far enough into the always (integrally) closed outer rings.

What I claim is:—

1. A friction spring unit of the character set forth, comprising telescopable annuli presenting complemental tapered friction faces, the inner annuli being split and normally open and the outer annuli integrally closed, the arrangement being such that the end faces of the open inner annuli will abut before the compression stroke is completed or the spring goes solid.

2. A friction spring unit of the character set forth, comprising telescopable annuli presenting complemental tapered friction faces, the inner annuli being split and helically distorted and normally open and the outer annuli integrally closed, the arrangement being such that the end faces of the open inner annuli will abut before the compression stroke is completed or the spring goes solid.

3. A friction spring unit of the character set forth, comprising nested telescopable annuli, each annulus presenting a pair of oppositely tapered friction faces, the tapers being of such inclination that they permit compression of the spring in response to an external, axially directed force, the inner annuli being split and normally open and the outer annuli integrally closed, and the arrangement being such that the end faces of said inner annuli will abut before the compression stroke is completed or the spring goes solid.

4. A friction spring unit of the character set forth, comprising nested telescopable annuli, each annulus presenting a pair of oppositely tapered friction faces, the tapers being of a character to permit compression of the spring in response to an external, axially directed force, the inner annuli being split and being helically distorted and normally open and the outer annuli being integrally closed, the arrangement being such that the end faces of said inner annuli will abut before the compression stroke is completed or the spring goes solid.

OSCAR R. WIKANDER.